United States Patent
Hulkkonen et al.

(10) Patent No.: US 7,200,401 B1
(45) Date of Patent: Apr. 3, 2007

(54) OPERATOR FORCED INTER-SYSTEM HANDOVER

(75) Inventors: Tony Hulkkonen, Helsinki (FI); Juha Back, Helsinki (FI)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 10/312,209

(22) PCT Filed: Jun. 29, 2000

(86) PCT No.: PCT/EP00/06094

§ 371 (c)(1),
(2), (4) Date: Jun. 5, 2003

(87) PCT Pub. No.: WO02/01902

PCT Pub. Date: Jan. 3, 2002

(51) Int. Cl.
*H04Q 7/20* (2006.01)
*H04Q 7/36* (2006.01)

(52) U.S. Cl. .............. 455/438; 455/436; 455/437; 455/440; 455/422.1; 455/432.1; 455/439; 455/443; 370/331; 370/332

(58) Field of Classification Search ........ 455/436–444, 455/435.1, 435.2, 435.3, 432.1, 432.2, 432.3, 455/422.1, 410, 411, 403, 426.1, 426.2, 445, 455/550.1, 433, 414.1, 414.2, 500, 517, 552.1, 455/558, 414.3, 414.4, 450, 452.2, 509; 370/331, 370/332, 338
See application file for complete search history.

(56) References Cited

U.S. PATENT DOCUMENTS

| | | | |
|---|---|---|---|
| 6,397,065 B1 * | 5/2002 | Huusko et al. | 455/435.2 |
| 6,438,370 B1 * | 8/2002 | Einola et al. | 455/422.1 |
| 6,584,314 B1 * | 6/2003 | Haumont et al. | 455/435.1 |
| 2002/0086682 A1 * | 7/2002 | Naghian | 455/456 |

FOREIGN PATENT DOCUMENTS

| | | |
|---|---|---|
| JP | 6-245247 | 9/1994 |
| WO | WO 95/07010 | 3/1995 |
| WO | WO 96/14719 | 5/1996 |
| WO | 9859513 | 12/1998 |
| WO | 0010355 | 2/2000 |
| WO | 0016577 | 3/2000 |
| WO | 0044189 | 4/2000 |
| WO | 0032001 | 6/2000 |

OTHER PUBLICATIONS

ETSI, "Change Request 08.08 CR A205", ETSI STC SMG2 Meeting 3-7 Apr. 2000, Chicago, Illinois, pp. 3-9.

* cited by examiner

*Primary Examiner*—Keith Ferguson
(74) *Attorney, Agent, or Firm*—Squire, Sanders & Dempsey L.L.P.

(57) ABSTRACT

A communication network system is disclosed, which comprises at least two different types of radio access networks attached to a core network. In the network system, a subscriber communicates via a first radio access network with the core network which forces handover of the subscriber to another type of radio access network on the basis of operator specific criteria.

20 Claims, 1 Drawing Sheet

OPERATOR FORCED INTER-SYSTEM HANDOVER

FIELD OF THE INVENTION

The present invention relates to communication network systems which utilize at least two different types of radio access networks which are attached to a core network.

BACKGROUND OF THE INVENTION

Considering a multi mode User Entity UE capable of communicating with two or more different types of radio access networks, for example GSM (Global System for Mobile communication) and UMTS (Universal Mobile Telecommunication Service), in IDLE state, the dual mode GSM/UMTS UE performs network selection as follows:

1. Try to select the last registered PLMN (Public Land Mobile Network),
2. Try to select the home PLMN,
3. Try to select a PLMN specified in the (U) SIM ((UMTS) Subscriber Identity Module) PLMN selector list,
4. Try to select any other PLMN.

After that, the Radio Access Network RAN (e.g. GSM RAN or UMTS RAN) and a cell are selected based on the signal strength. In other words, there is no preference of either RAN type over the other. After the UE has camped to a particular cell, it performs a registration to the PLMN. Whenever the user requests service from the network, it is initiated via the camped cell in the selected RAN.

When a UE is in ACTIVE state, e.g. the user has an ongoing call, the radio network controller in the respective RAN and the Core Network CN take care of the user's mobility by means of soft and hard handovers. In current mobile communication networks, a handover decision algorithm is located in a radio network controller of the respective radio access network, and it is not standardized in 3GPP (Third Generation Partnership Project) or ETSI (European Telecommunications Standards Institute), i.e. it is proprietary. The UE has no control over the type of radio access network via which the service is provided.

Moreover, current 3GPP and ETSI specifications do not provide any tools for an operator operating a GSM/UMTS network, for example, which enable the usage of either of them over the other.

However, operators have indicated that they need means to control what type of radio access network users are using. Control over the used radio access system type becomes even more necessary, when new radio access systems are introduced to current wireless communication systems, for example BRAN (Broadband Radio Access Networks) and GERAN, and integration with other access types, e.g. WLAN (Wireless Local Area Network), becomes reality.

Up to now, merely a mechanism has been presented, which is a parameter in a Channel Type Information Element in Base Station System Management Application Part protocol and can be used to hand over a connection from GSM to UMTS.

SUMMARY OF THE INVENTION

It is an object of the present invention to provide a communication network system and a method, realizing an operator forced handover to another type of radio access network.

According to the present invention, this object is achieved by a communication network system which comprises at least two different types of radio access networks attached to a core network. In the network system, a subscriber communicates via a first radio access network with the core network, the core network forcing handover of the subscriber to another type of radio access network on the basis of operator specific criteria.

Moreover, the above-mentioned object is achieved by a method of handing over a subscriber communicating via a first radio access network with a core network to another type of radio access network, the radio access networks being attached to the core network in a communication network system comprising at least two different types of radio access networks, wherein the handover of the subscriber to the other type of radio access network is forced by the core network on the basis of operator specific criteria.

According to an embodiment of the present invention, the core network indicates that a handover is needed to the other type of radio access network in an assignment request message sent to the first radio access network. This is needed in case the user equipment requests a service via a radio access network type which is not the preferred one from the service provider's point of view. I.e. the operator wants to provide the requested service via another type of radio access network.

Furthermore, according to another embodiment, the core network indicates the first type of radio access network as a preferred radio access network in a handover request message sent to the other radio access network. This is needed if a handover is performed from the preferred radio access network type to another radio access network type which is not optimal to provide the service from the service provider's point of view. It enables the handover to be performed to the preferred type of radio access network when it becomes available (e.g. due to coverage reasons).

According to the present invention, the operator specific criteria may comprise a requested service, subscriber's identity, subscriber's location and/or a required security level.

The core network analyzes the subscriber's identity upon receiving a service request from the first radio access network and forces a handover to the other type of radio access network on the basis of the analysis result. This enables the service provider to provide the best possible service for its own subscribers, e.g. in terms of quality of service.

According to an embodiment, allowed radio access network types may be specified as subscriber parameters in a subscriber database and transmitted to the core network. This enables a user and/or the service provider to indicate to the visited network the type of radio access network which should be used to provide service for a particular subscriber.

Moreover, according to an embodiment, the core network indicates location information and a target radio access network type in an assignment request message sent to the first radio access network. This enables the network system to control the type of radio access network used to provide the service based on location. This can be used e.g. to handover some of the users from UMTS access to GSM in an area where a limited capacity is available in UMTS band.

According to another embodiment, the core network transmits location information and a type of target radio access network to the first radio access network at any time during an active connection. This provides more flexibility for the control of handover, since the required information does not necessarily have to be sent at the connection establishment.

Furthermore, the core network analyzes the required security level of a requested service and forces handover on the basis of the analysis result. In this context, a set of permitted security algorithms may be specified in a subscriber database and transmitted to the core network. This allows the user to be sure that at least the minimum required security level is applied for his/her services. E.g. if a user requests a service which requires higher security level than the one he/she is currently using, an inter-system handover would be performed if the serving radio access network can not provide a required security level.

According to the present invention, by minor changes to open interfaces, the operator gets a maximum flexibility to control the access to different types of radio access networks. In particular, a set of tools is introduced for an operator to control who (subscriber's identity), for what (services), where (location) uses a particular type of radio access network in his network system.

In the following, the present invention will be described by way of preferred embodiments thereof with reference to the accompanying drawings.

DETAILED DESCRIPTION OF THE PREFERRED EMBODIMENTS

Figure 1:
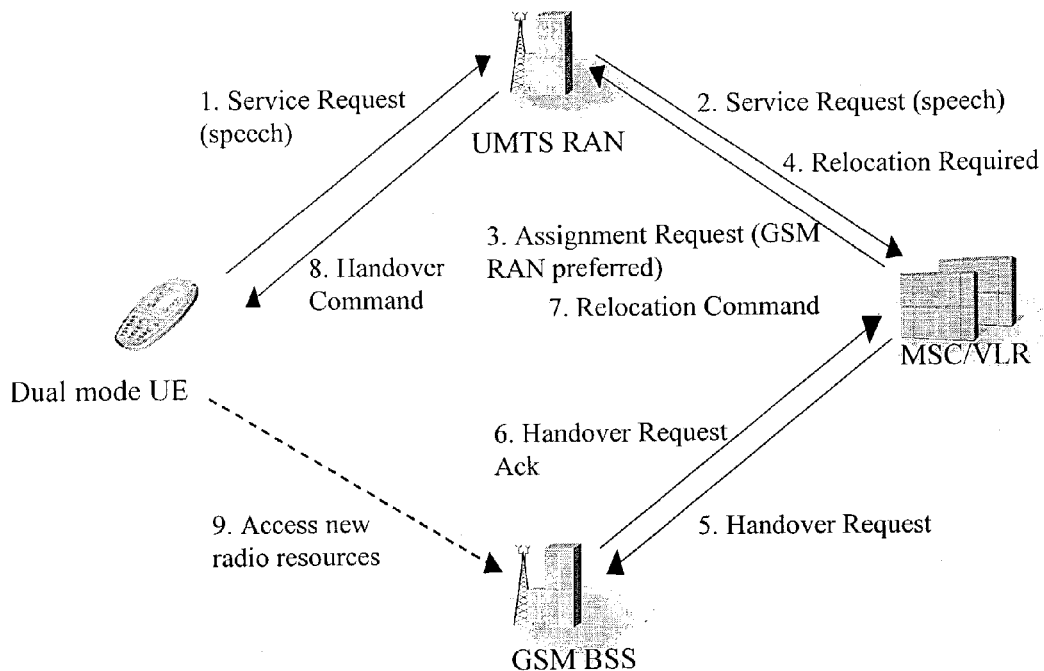
FIG. 1 shows a schematic diagram of a service based forced inter-system handover.

The basic idea of the present invention is to allow the core network to get control over the radio access network type which is used to provide service to different subscribers.

This invention does not set any predefined preference for any radio access network type. The described mechanisms and principles are applicable to any kind of radio access networks, e.g. WLAN, UMTS, BRAN, GSM, GERAN, IS-136, etc.

Besides handovers due to the movement of terminal equipment and for traffic balancing reasons, operators ask for the possibility to trigger a handover between two different types of radio access networks, i.e. an inter-system handover, on the basis of other issues. According to the present invention, the following forced inter-system handover types and examples of their implementation in a mobile communication network system are described:

1. Handover Based on the Requested Service

For example, while roaming via UMTS radio access, a user may request a simple speech service from the network. At the connection establishment, the user's connection can be handed over to the GSM radio access network where the requested service can be provided and the capacity of the UMTS band can be dedicated preferably to packet data services.

2. Handover Based on the Identity of the Subscriber or Subscriber's Home Network At a service request, the core network can analyze subscriber's identity, for example IMSI in GSM and UTMS, to find out whether the subscriber is operator's "own" subscriber or a visiting subscriber. Based on the operator specific criteria, the core network can indicate in an assignment request that the connection is to be handed over to another radio access network type. Furthermore, allowed radio access network types can be specified as subscriber parameters in the HLR database and VLR-HLR interface (Visitor Location Register-Home Location Register interface). This allows the operator to control the access to different radio access network types at the level of individual subscribers.

For example, an operator can give preference to own subscribers to access the UMTS access network, and the roaming subscribers are handed over to the GSM radio access network.

3. Handover Based on the Location of the Subscriber

There are two ways to implement this functionality:

the location information and the target radio access network type are indicated in the Assignment Request and Handover Request messages transmitted by the core network, and/or a procedure to be used between the core network and the radio access network, e.g. in Iu- and A-interface, is introduced, which conveys the required information to the serving radio access network.

For example, when a subscriber enters some particular LSA (Localized Service Area) or geographical area, the subscriber's connection is handed over to a predefined radio access network.

The added functionality introduced by the procedure to be used between the core network and the radio access network is that the necessary information about the target network does not have to be sent at the connection establishment or handover. The needed information can be sent at any time during an active connection.

4. Handover Based on the Required Security Level

In the simplest scheme the serving core network entity, e.g. MSC/VLR or SGSN (Serving GPRS Support Node), analyses the requested service and makes a decision whether the currently used security level is acceptable or not.

For example, in case of establishing a data connection for transfer of sensitive data, the handover to corporate WLAN may be more preferred than using UMTS.

5. Handover Based on a Combination of the Above Criteria

For example, the speech service is provided for roaming users only via GSM radio access. Therefore, when the connection is established via UMTS RAN, in case the subscriber is a visiting one, the connection is handed over to GSM.

The criteria used for enforcing handover are not restricted to those explained above.

In the following, the technical implementation of the above explained criteria will be described with respect to FIGS. 1 and 2.

FIG. 1 shows a realization of an operator forced handover based on the requested service.

Before the service request is sent by a User Entity UE, a core network (here MSC/VLR) has identified and authenticated the user and potentially started ciphering at a radio interface.

In communication 1 from the UE to a first radio access network UMTS RAN, the UE camped on a UMTS cell requests a certain service from the network, for example a basic speech service. In communication 2, the Service Request is forwarded by the radio access network UMTS RAN to the core network. The UMTS RAN identifies that the UE is a dual mode GSM/UMTS terminal and may instruct the UE to perform measurements on GSM neighbor cells.

The core network represented by MSC/VLR analyses the requested service and initiates a radio channel assignment procedure towards UMTS RAN (communication 3). Based on operator specific criteria, the Assignment Request contains an indication that the connection should be handed over to another type of radio access network, in this case to GSM. The criteria for the handover enforced by the core network here is that a simple speech service is requested and the requested service can be provided via GSM. If there is GSM coverage in that particular area in which the UE is currently located and the measurement reports provided by the UE allow the handover, the serving UMTS RAN initiates an inter-system handover by sending a Relocation Required message (communication 4) to the MSC/VLR. It is to be noted that, if there is currently no GSM coverage or the UE has not sent any measurement reports, the serving UMTS RAN may delay the handover and reserve radio resources for the connection.

In communication 5, the MSC/VLR sends a Handover Request to a Radio Network Controller (RNC) of the target RAN, in the present case to GSM BSS (GSM Base Station System). After the required radio resources have been reserved the target RAN (GSM BSS) sends a Handover Request Acknowledge message to the MSC/VLR (communication 6). Then, in communication 7, the MSC/VLR sends a Relocation Command to the serving UMTS RAN. The serving UMTS RAN sends an L3-RRC (Layer 3—Radio Resource Control) Inter-System Handover Command to the UE (communication 8), and, subsequently, the UE accesses the radio resources in the GSM radio access network (communication 9).

The above described handover procedure can be further extended by specifying the preferred radio access system indication in the Handover/Relocation Request messages. This scenario will be explained with respect to FIG. 2.

Figure 2:
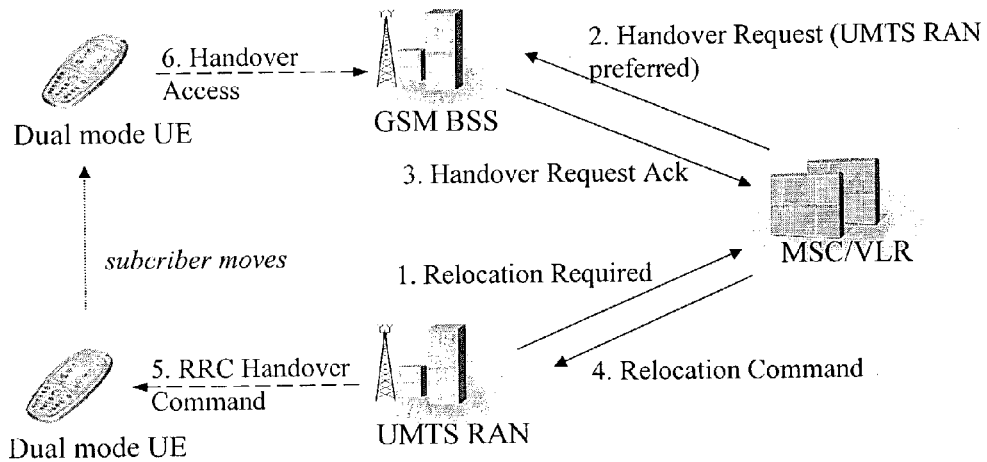
FIG. 2 shows a schematic diagram of a "back to UMTS when UMTS becomes available" handover.

In communication 1 in FIG. 2, the RNC of the UMTS RAN which the UE is camped on initiates a handover to GSM BSS, for example due to coverage reasons, and sends a Relocation Required message to the MSC/VLR. The MSC/VLR identifies that the service used by the UE or subscriber cannot be provided with the same QoS (Quality of Service) in GSM. Thus, it performs service level downgrading and indicates in the Handover Request message to the GSM BSS (communication 2) that, when UMTS coverage becomes available, the connection should be handed over back to UMTS.

In communication 3, the GSM BSS sends a Handover Request Acknowledge to the MSC/VLR. Subsequently, the MSC/VLR transmits a Relocation Command to the UMTS RAN (communication 4). Upon receiving this command, the UMTS RAN sends an RRC Inter-System Handover Command to the UE (communication 5). After that, the UE accesses the radio resources in the GSM radio access network (communication 6).

With respect to FIG. 1, a service based forced inter-system handover from UMTS to GSM is described. As mentioned above, the handover can be based also on the subscriber's identity or the subscriber's home network identity.

In this case, at the Service Request (communication 1 in FIG. 1), the core network (MSC/VLR) analyzes the subscriber's identity in order to find out whether the subscriber is operator's "own" subscriber or a visiting subscriber. Based on the operator specific criteria and based on the analysis result, the core network indicates in the Assignment Request (communication 3 in FIG. 1) that the connection is to be handed over to another radio access network type.

Thus, a similar procedure as shown in FIG. 1 can be used in connection with an operator forced inter-system handover based on the subscriber's identity.

This can be further extended by specifying the allowed radio access network types as subscriber parameters in the HLR and VLR-HLR interface. This allows the operator to control the access to different radio access network types at the level of individual subscribers.

Furthermore, the triggering of the inter-system handover can be based on the location of the subscriber. For example, handover can be forced when a subscriber enters or exits a particular SA (Service Area), LSA (Localized Service Area), or geographical area.

There are basically two ways to specify the required functionality. One way is to indicate the location information and the target radio access network type in the Assignment Request message (communication 3 in FIG. 1) and the Handover Request message (communication 5 in FIG. 1).

Alternatively, a new procedure, for example a location based handover request, is introduced between the core network and the radio access network in the Iu- and A-interface, for example, which conveys the required information to the serving radio access network. It should be noted, that the location based handover request message does not initiate a handover procedure. It only provides additional information for the handover decision algorithm in the radio access network. The information specifies when the handover should be initiated (location), and where it should be performed (the type of target radio access network(s) in preferred order). The benefit of this added functionality is that the necessary information about the target network does not have to be sent at the connection establishment or handover. The needed information can be sent at any time during an active connection.

The forced handover based on the security level does not necessarily require any additional changes to current standards. In the simplest scheme the serving core network entity, for example MSC/VLR in GSM or SGSN in GPRS, analyzes the requested service and makes a decision whether the currently used security level is acceptable or not. This can be further enhanced by specifying a mechanism to convey a set of permitted security algorithms from a home domain (HLR (Home Location Server), HSS (Home Subscriber Server), AAA server (Authentication, Authorization and Accounting) to the serving core network element (i.e. SGSN or MSC/VLR). There may be a single set of permitted algorithms or a service specific set of permitted algorithms. In GSM/UMTS, this information may be sent in MAP (Mobile Application Part) Send Identification Info and MAP Send Authentication Info operations.

According to the present invention, assignment and handover procedures are described which an operator can use to force the user to access another type of radio access network than the one currently used. The criteria used for handover is not restricted to those presented as examples above. The principle of the implementation of the present invention in the core network is the introduction of a set of tools for an operator to control who (subscriber's identity), for what (services), where (location) uses a particular type of radio access network in their network system, for example WLAN, UMTS, BRAN, GSM, GERAN, IS-136, WCDMA, etc. That is, a flexible handover algorithm can be provided, which behavior can be specified by the operator by using a set of configurable parameters. For example, in introducing only one new parameter into the Assignment Request, the operator can flexibly control the access to different types of radio access networks.

The present invention is applicable to wireless mobile communication systems having at least two different types of radio access networks attached to the core network.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

The invention claimed is:

1. A communication network system comprising at least two different types of radio access networks attached to a core network, wherein:
   a subscriber is adapted to communicate via a first radio access network with the core network; and
   the core network is adapted to force handover of the subscriber to another type of radio access network on the basis of operator specific criteria,
   wherein the operator specific criteria comprise subscriber's identity, and
   wherein the core network is adapted to analyze the subscribers identity upon receiving a service request from the first radio access network and to force a handover to the another type of radio access network on the basis of the analysis result, and to indicate that the first radio access network is a preferred radio access network in a handover request message sent to the another radio access network.

2. A network system according to claim 1, wherein the core network is adapted to indicate in an assignment request message sent to the first radio access network that a handover to the other type of radio access network is needed.

3. A network system according to claim 1, wherein the core network analyzes the subscriber's identity upon receiving a service request from the first radio access network and forces a handover to the other type of radio access network on the basis of the analysis result.

4. A network system according to claim 1, wherein allowed radio access network types are specified as subscriber parameters in a subscriber database and are transmittable to the core network.

5. A network system according to claim 1, wherein the operator specific criteria comprise subscriber's location.

6. A network system according to claim 5, wherein the core network is adapted to indicate location information and a type of target radio access network in an assignment request message sent to the first radio access network.

7. A network system according to claim 5, wherein the core network is adapted to transmit location information and a type of target radio access network to the first radio access network at any time during an active connection.

8. A network system according to claim 1, wherein the operator specific criteria comprise a required security level.

9. A network system according to claim 8, wherein the core network is adapted to analyze the required security level of a requested service and to force handover on the basis of the analysis result.

10. A network system according to claim 9, wherein a set of permitted security algorithms is specified in a subscriber database and is transmitted to the core network.

11. A method of handing over a subscriber communicating via a first radio access network with a core network to another type of radio access network, the radio access networks being attached to the core network in a communication network system comprising at least two different types of radio access networks, wherein the handover of the subscriber to the other type of radio access network is forced by the core network on the basis of operator specific criteria,
   wherein the operator specific criteria comprise subscriber's identity,
   wherein the subscriber's identity is analyzed by the core network upon receiving a service request from the first radio access network and a handover to the other type of radio access network is forced on the basis of the analysis result, and
   wherein the core network is configured to indicate that the first radio access network is a preferred radio access network in a handover request message sent to the another type of radio access network.

12. A method according to claim 11, wherein it is indicated in an assignment request message sent from the core network to the first radio access network that a handover to the other type of radio access network is needed.

13. A method according to claim 11, wherein the operator specific criteria comprise a requested service.

14. A method according to claim 11, wherein allowed radio access network types are specified as subscriber parameters in a subscriber database and are transmitted to the core network.

15. A method according to claim 11, wherein the operator specific criteria comprise subscriber's location.

16. A method according to claim 15, wherein location information and a type of target radio access network is indicated in an assignment request message sent from the core network to the first radio access network.

17. A method according to claim 16, wherein location information and a type of target radio access network is transmitted by the core network to the first radio access network at any time during an active connection.

18. A method according to claim 11, wherein the operator specific criteria comprise a required security level.

19. A method according to claim 18, wherein the required security level of a requested service is analyzed by the core network and a handover is forced on the basis of the analysis result.

20. A method according to claim 18, wherein a set of permitted security algorithms is specified in a subscriber database and is transmitted to the core network.

* * * * *